March 19, 1940. L. W. THOMPSON 2,194,334
ELECTRIC CIRCUIT
Filed July 14, 1937
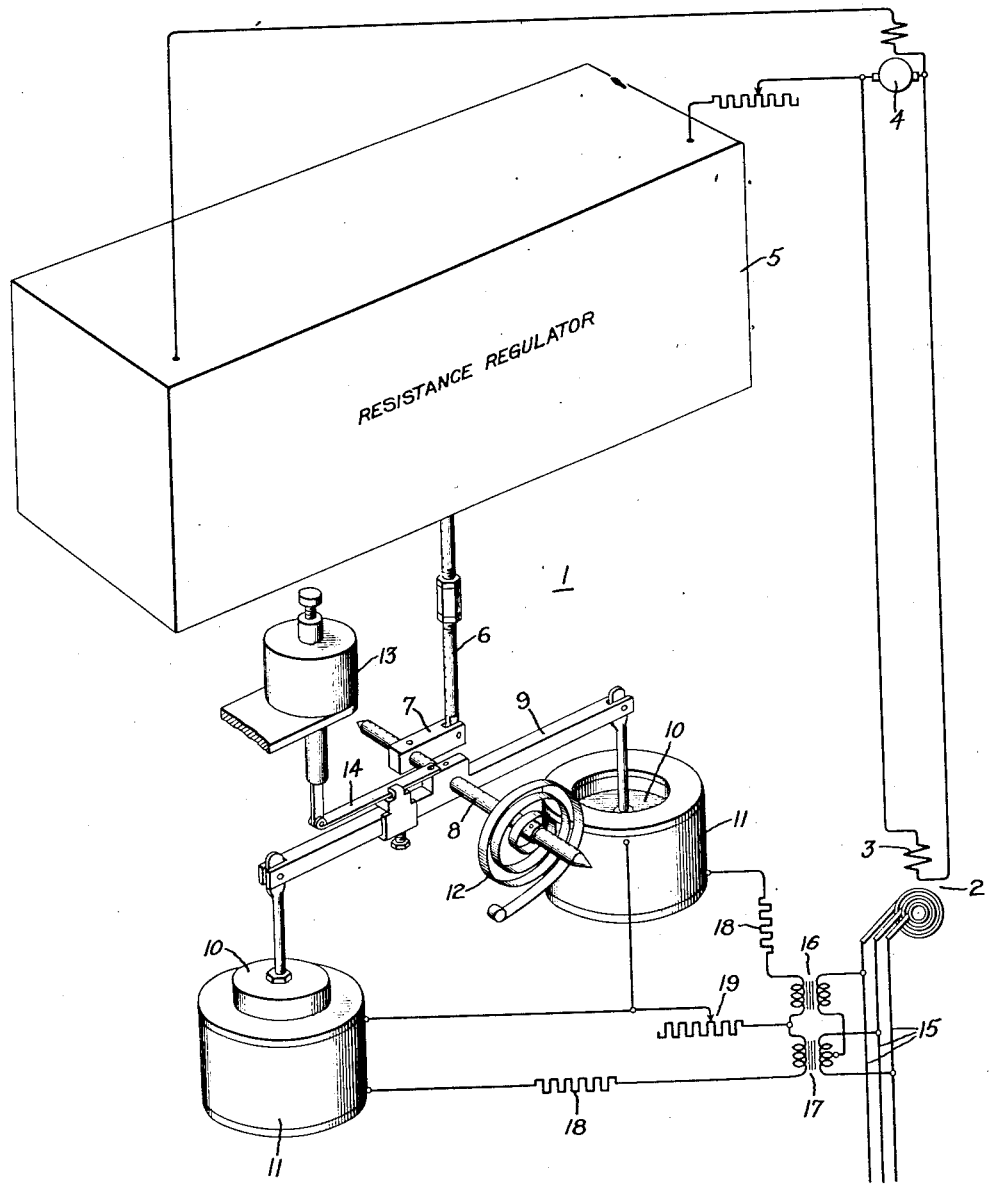
Inventor:
Louis W. Thompson,
by Harry E. Dunham
His Attorney.

Patented Mar. 19, 1940

2,194,334

UNITED STATES PATENT OFFICE 2,194,334

ELECTRIC CIRCUIT

Louis W. Thompson, Schenectady, N. Y., assignor to General Electric Company, a corporation of New York Application July 14, 1937, Serial No. 153,539

1 Claim. (Cl. 171—119)

My invention relates to electric circuits and more particularly improvements in polyphase electroresponsive circuits.

So long as a polyphase circuit is balanced a single phase electroresponsive device which is connected to respond to an electrical condition of any one of the phases of the circuit will give a reliable indication of the same condition of the other phases. However, during unbalanced conditions, such for example as a short circuit on one phase of a three phase circuit, the voltage of one of the other phases will often increase rather than decrease. Consequently an electroresponsive device connected across the phase whose voltage increases when another phase is short circuited will give a false indication and if the electroresponsive device controls an automatic regulator for the circuit it will cause the regulator to operate in the wrong direction.

Heretofore, this difficulty has been overcome by the use of rectifiers or polyphase torque-motors or so-called symmetrical phase sequence component segregating networks. Rectifiers, however, introduce undesirable temperature and other errors. Polyphase torque motors having the necessary accuracy and sensitivity are difficult and expensive to manufacture in quantities. Phase sequence networks are difficult to manufacture in quantities as they require the accurate balancing or matching of impedance elements and in addition their output in practical sizes is very limited.

In accordance with my invention, I provide a novel and simple circuit which is operable on alternating current, which is inexpensive to construct and which causes proper response of an electroresponsive device to variations in balanced and unbalanced conditions of a polyphase circuit or machine.

An object of my invention is to provide a new and improved electric circuit.

A further object of my invention is to provide a simple and inexpensive polyphase electroresponsive circuit.

My invention will be better understood from the following description taken in connection with the accompanying drawing and its scope will be pointed out in the appended claim.

Referring now to the single figure of the accompanying drawing, I have shown my invention diagrammatically therein as applied by way of example to an automatic variable resistance type regulator 1 for a three-phase dynamo electric machine 2. This machine, for example, may either be a synchronous generator, a synchronous motor or a synchronous condenser, but for the present purpose of explaining my invention it will be assumed to be a synchronous generator.

Machine 2 has a conventional excitation circuit consisting of a field winding 3 energized by an exciter 4 whose excitation is in turn controlled by any suitable variable resistance shown schematically as the resistance regulator 5. This resistance regulator may be of any well-known type, such for example as a carbon pile or movable contact rheostat. Its resistance value is controlled by a rod 6 fastened to a crank arm 7 on a pivotally mounted shaft 8. Fastened to shaft 8 is a rocking arm 9, to the opposite ends of which are connected mechanically the solenoid cores 10 of a pair of operating magnets 11. When energized the magnets 11 cause their respective cores to transmit forces to the beam 9 in opposite absolute directions but by reason of the fact that the cores are on opposite sides of the shaft 8, their effects are cumulative tending to rotate the arm 9 in a counter-clockwise direction. This rotation is opposed by a spring 12.

Hunting of the regulator is prevented by a dash pot 13 connected to the beam 9 by means of a spring connection 14.

The electroresponsive windings 11 are energized in accordance with the voltage of the generator 2 or its three phase output circuit 15 by means of a pair of potential transformers 16 and 17. These transformers are T or so-called Scott connected, transformer 17 being the main transformer and transformer 16 being the teaser transformer. With this connection a balanced three phase input is transformed into a balanced quarter or two phase output and as shown the secondary winding of each transformer is connected to one of the magnet windings 11, through conventional series resistors 18 for reducing the temperature error of the circuit. Adjustable resistance 19 is in the common circuit of both windings for making any necessary adjustments or changes in setting of the regulator.

I have found that by reason of transformation from a given number of input phases to a different number of output phases for operating an electroresponsive device, that the response is always in the proper direction regardless of whether variations on the main circuit are balanced or unbalanced. This operation is facilitated by having a linear response of the regulator to the output of the T-connected transformer.

The operation of the two transformers 16 and 17 in changing from a three phase input to a quarter phase output is well understood by those skilled in the art and is fully explained in standard text books on alternating current electrical machinery.

The general operation of the illustrated system as a whole is that of any conventional automatic resistance type generator voltage regulator. Thus, if the voltage conditions on the circuit 15 change in such a way as to decrease the combined pull of the magnets 11 the spring 12 will rotate the beam in a clockwise direction thereby moving the lever 6 downward which will decrease the resistance of the resistance regulator in any well-known manner thereby increasing the excitation of the exciter 4 and consequently in turn increasing the excitation of the generator 2 until the voltage is again restored to a normal value. If on the other hand, the voltage increases thereby causing the combined pull of the magnets 11 to overpower the opposing torque of the spring 12 the beam 9 will be moved in a counterclockwise direction moving the lever 6 upwardly and causing an increase in resistance thereby to decrease the excitation of the exciter 4 and in turn decrease the excitation of the generator 2 until the voltage of generator 2 is again returned to its normal value.

The arrangement of the two coils or operating elements 11 in the manner shown, instead of forming a quarter phase stator of a torque motor for example, is a very simple and inexpensive construction which is easy to manufacture in large quantities. Furthermore, it is an inherently balanced construction which does not tend to change the resistance of the regulator as the whole device is tilted. Such tilting in a periodic manner is encountered in ship installations, for which my arrangement is particularly adapted. It should be understood, however, that when I refer in the claims to an electroresponsive device having two operating elements, it is intended that these elements may combine either electrically or mechanically or in any other well-known manner to produce a resultant operating effect.

While I have shown and described a particular embodiment of my invention, it will be obvious to those skilled in the art that changes and modifications may be made therein without departing from my invention and consequently, I aim in the appended claim to cover all such changes and modifications as fall within the true spirit and scope of my invention.

What I claim as new and desire to secure by Letters Patent of the United States is:

In an electrical system of distribution of the class wherein a three-phase alternating current generator supplies current to a three-phase circuit and the voltage of said circuit is maintained constant by an automatic generator voltage regulator having a pair of cumulatively acting voltage responsive main control coils, the combination with said coils of a T-connected transformer arrangement having a three-phase input circuit provided with three conductors connected respectively to the conductors of said three-phase circuit and having a quarter phase output circuit provided with three conductors, one of said output circuit conductors being connected to a terminal of each of said coils and the remaining output conductors being connected respectively to the remaining terminals of said coils.

LOUIS W. THOMPSON.